Sept. 12, 1961    M. M. JENKINS ET AL    2,999,262
APPARATUS FOR CLEANING CORRUGATED PARTITION STRIPS
Filed April 15, 1958    4 Sheets-Sheet 1

INVENTORS
MERVYN M. JENKINS
JAY R. MACY
J. R. NELSON &
W. A. SCHAICH
ATTORNEYS

Sept. 12, 1961  M. M. JENKINS ET AL  2,999,262
APPARATUS FOR CLEANING CORRUGATED PARTITION STRIPS
Filed April 15, 1958  4 Sheets-Sheet 2
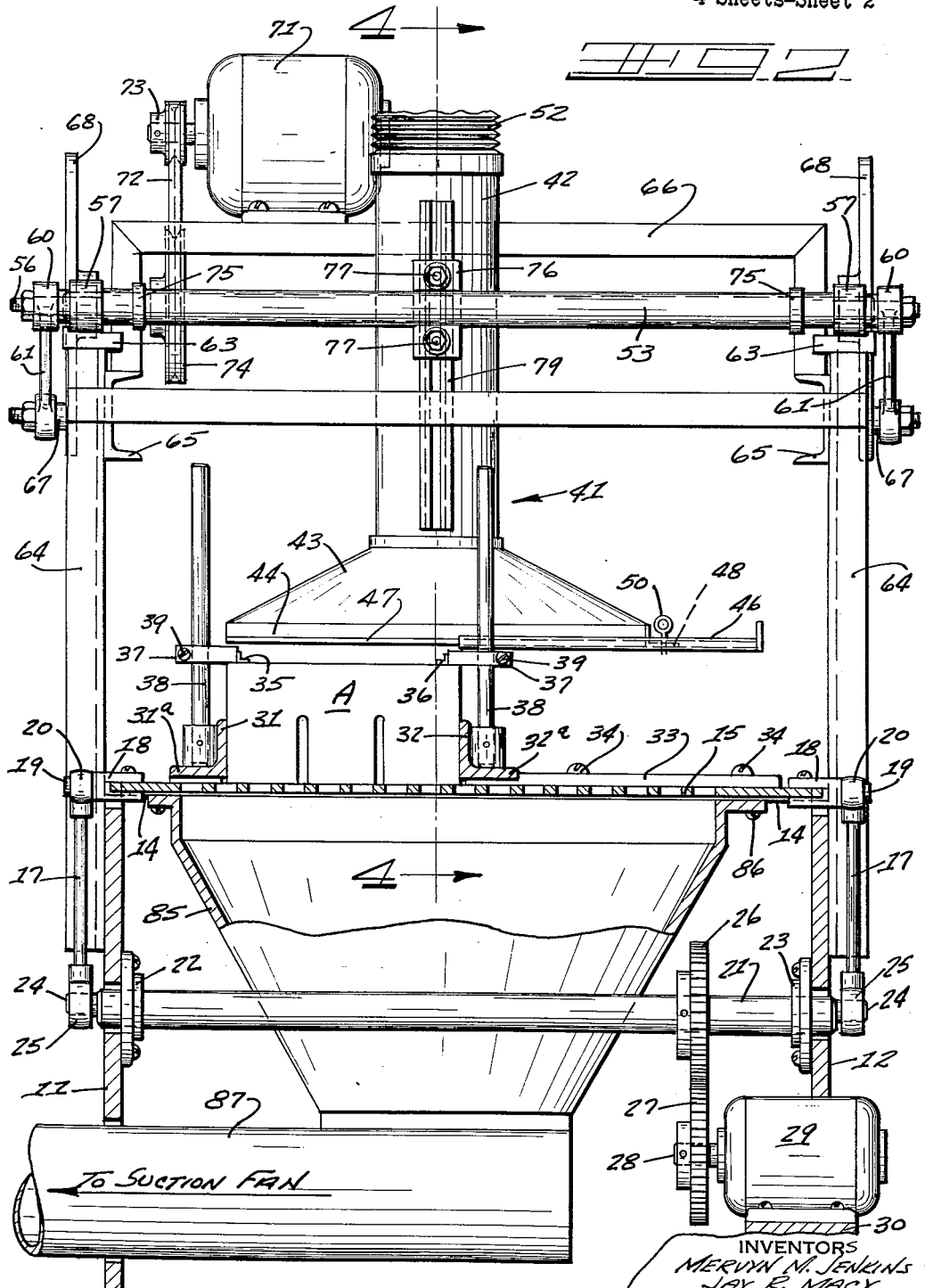
INVENTORS
MERVYN M. JENKINS
JAY R. MACY
BY J. R. NELSON
& W. A. SCHAICH
ATTORNEYS Sept. 12, 1961  M. M. JENKINS ET AL  2,999,262
APPARATUS FOR CLEANING CORRUGATED PARTITION STRIPS
Filed April 15, 1958  4 Sheets-Sheet 3
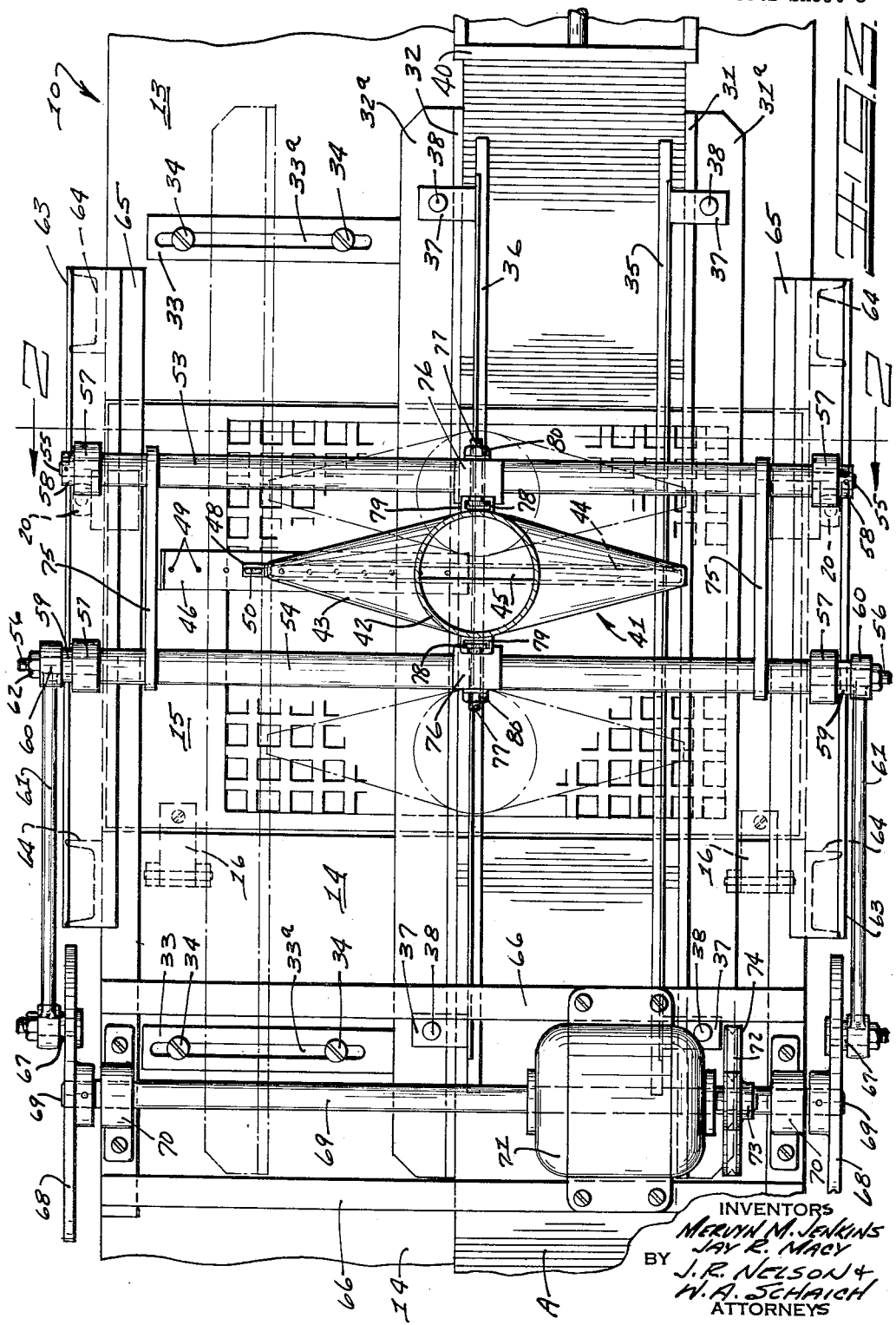
INVENTORS
MERVYN M. JENKINS
JAY R. MACY
BY J. R. NELSON &
H. A. SCHAICH
ATTORNEYS

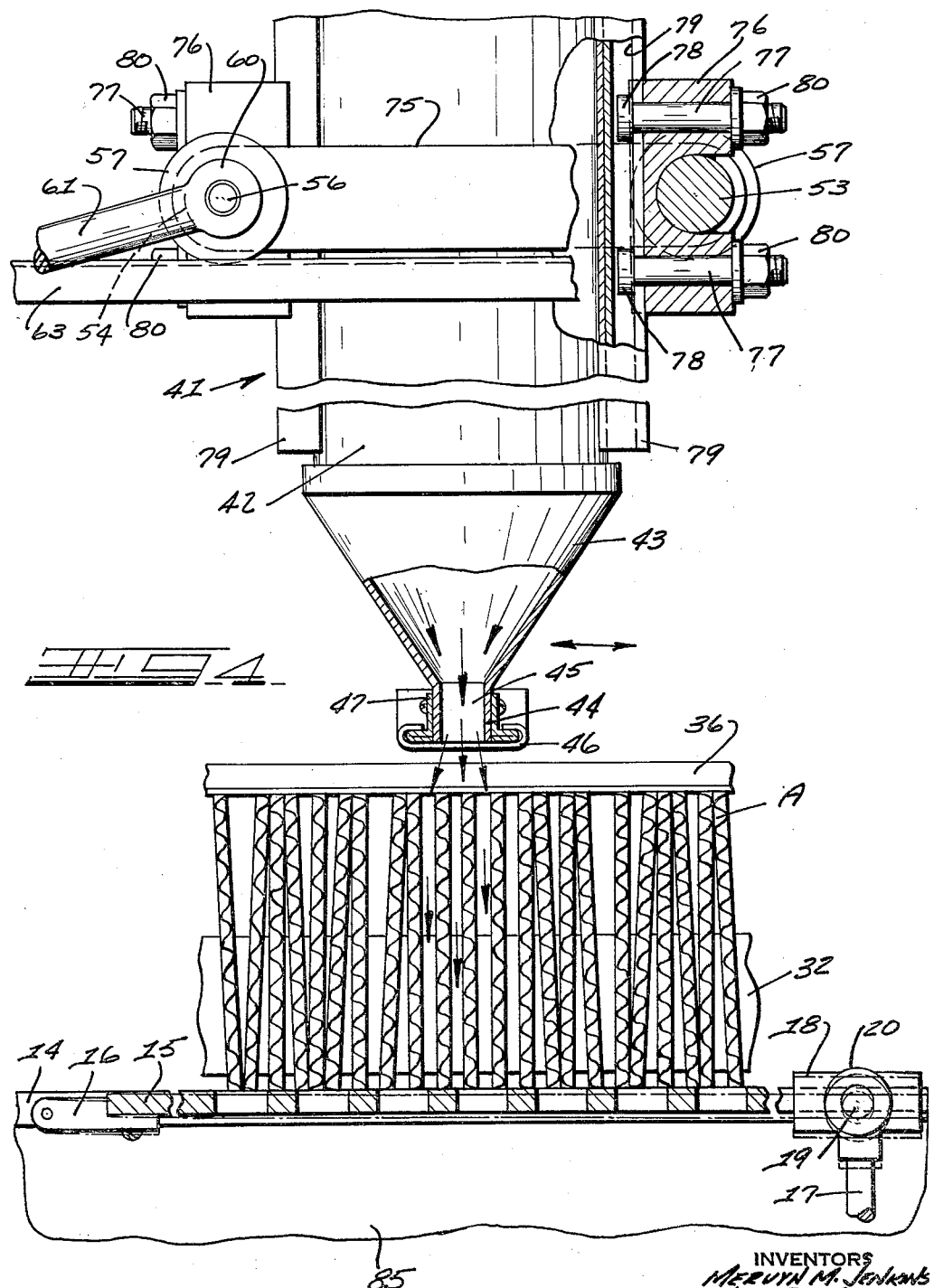

2,999,262
APPARATUS FOR CLEANING CORRUGATED PARTITION STRIPS
Mervyn M. Jenkins and Jay R. Macy, Waco, Tex., assignors to Owens-Illinois Glass Company, a corporation of Ohio
Filed Apr. 15, 1958, Ser. No. 728,644
11 Claims. (Cl. 15—307)

This invention relates to a means for cleaning dust particles from formed partition strips of corrugated board or the like, and more particularly to apparatus for cleaning dust particles and other foreign matter from such partition strips subsequent to their being sawed and slotted but prior to their assembly in containers or cartons.

In forming these partitions, strips of corrugated board or similar material are sawed into shorter lengths As they are sawed, the strips are fed on edge in bundles through a saw and the sawed short lengths are then moved along a horizontal table surface. One example of this type of partition saw is described more fully in the copending application of F. A. McCormick, Serial No. 585,518, now Patent No. 2,855,009, owned by the assignee of this application. As part of the process in forming the partitions, the strips that are sawed to short lengths are compacted, while upright on edge, and moved between guides so as to pass over a plurality of slotting saws which cut a pattern of vertical slots in the strips. These slotted strips are later assembled in combination with other partition strips to form a gridwork of cells or rectangular compartments in a shipping container or carton. As is customary practice, the sawed and slotted partitions are moved along a horizontal table surface to a point where they are removed for later performing this partition assembly and insertion into the carton.

During the sawing and slotting of the partition strips, a hazard is created by dust particles of the corrugated material, paper fuzz or other foreign matter, clinging to the surfaces of the partition. This dust later dislodges during either handling and assembly operations or after assembly which causes uncomfortable and unhealthy dust conditions in the box plant, and moreover, any of the dust particles which carry over into the completed carton later contaminate the content of the carton. For example, in the glass bottle industry the cartons are filled with empty open bottles and then either stored for later shipment or shipped at that time to the bottler customer. During storage or transit, the dust particles that dislodge in the carton will be permitted to enter the bottles, creating a costly additional cleaning problem for the bottler customer prior to filling the bottles with content at his mechanized filling lines.

It is an important object of the present invention, therefore, to provide apparatus for efficiently and economically cleaning the loose dust particles and foreign matter from the formed paper partitions after they are fed in bundles or charges from the partition saws by subjecting the partitions to a moving flow of high velocity air directed into the partitions and oscillating past their surfaces thereby causing a feathering or fluttering action between the partitions in the charge, which dislodges and removes such dust and foreign matter.

Another object of this invention is the provision of apparatus, as just mentioned, that is adaptable for use with present partition sawing and slotting machinery to effectively clean the partitions of dust particles prior to handling so as to overcome the above mentioned dust hazard both in the box plant and in connection with contamination of the content of assembled cartons.

Another object of the invention is to provide apparatus adapted for use with present partition sawing and slotting machinery for affecting removal of dust particles from the partitions formed thereby, this apparatus including means for moving air across the surfaces of the formed partition strips.

Another object of the invention is the provision of apparatus for oscillating this air flow and directing it into a bundle or charge of the formed partitions.

A further object of the invention is to provide apparatus for affecting removal of dust particles from sawed and slotted partitions and is readily adjustable to accommodate various sizes of partitions.

Other objects and advantages of the present invention will become apparent from a reading of the folowing description of a preferred embodiment, the appended caims, and the accompanying drawings of the preferred embodiment to which reference is made and in which:

FIG. 2 is a sectional end elevational view taken along line 2—2 on FIG. 3.

FIG. 3 is a part sectional plan view of the apparatus shown on FIG. 1.

FIG. 4 is an enlarged sectional elevational view, taken along line 4—4 on FIG. 2.

Figure 1:
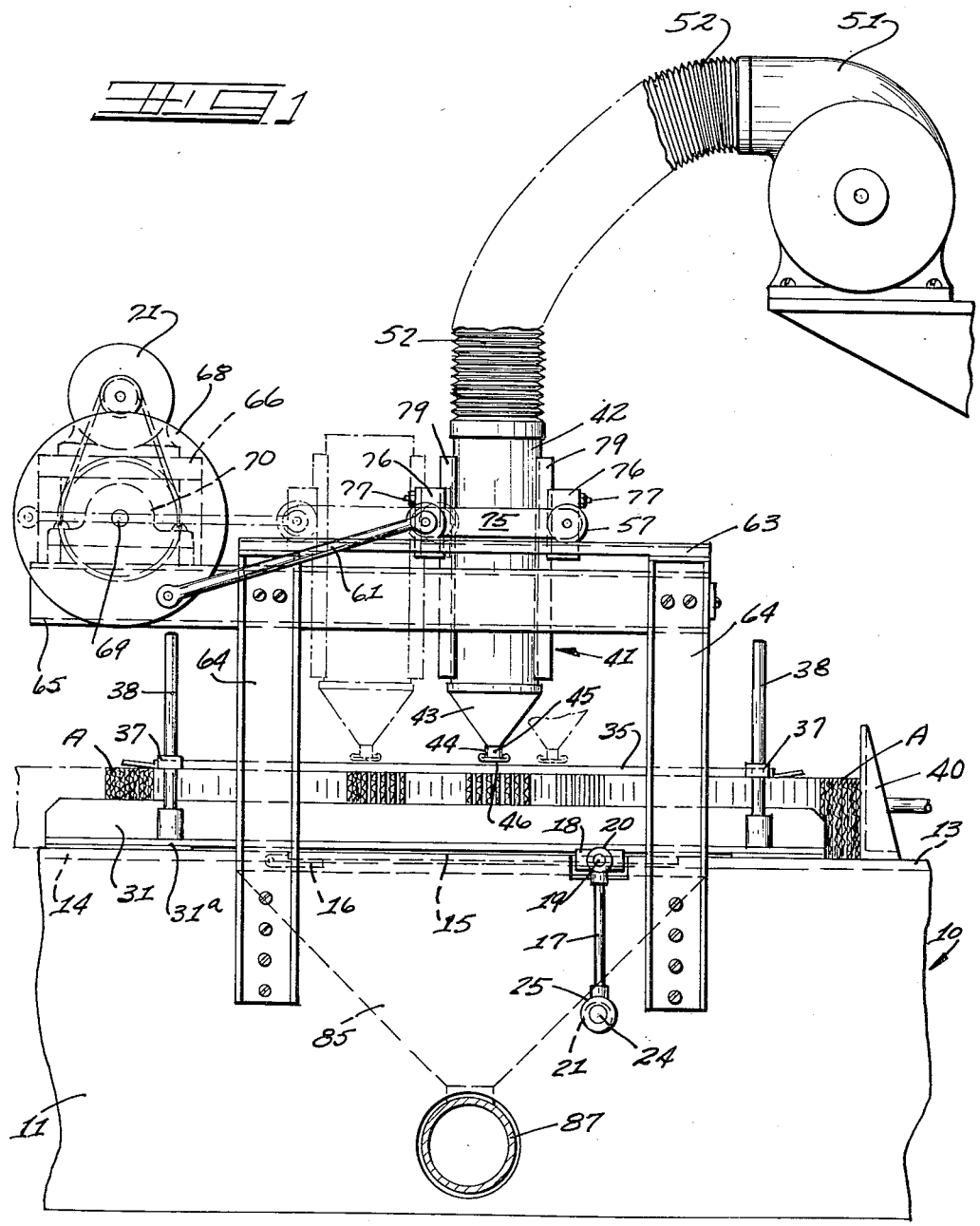
FIG. 1 is a side elevational view showing a preferred form of the apparatus of the invention.

As a practical example for practicing of the present invention, corrugated or like strips of material are sawed to length and slotted on a machine and thereafter moved in a continuous column or stack by pushing them along a horizontal surface. The partitions of this stack are upright on one edge surface in a closed side-by-side relationship such that they rest on the horizontal surface with their lengthwise dimension extending transversely of the direction of movement of the column or stack. The forward end of the stack is unrestricted for movement in the horizontal direction. The forward or advancing movement of the stack may be either continuous or intermittent, however, the feeding movement, as herein illustrated, is by intermittent strokes of a pusher. Regardless in which manner the stack is advanced, the partitions thereof will be fed as groups or charges through a cleaning zone on a perforate section of the horizontal surface of a table. While at the cleaning zone, a high velocity stream of air is directed into a charge of the partitions, which will include a portion of the column thereof, and this stream of air is oscillated along the path of movement of the charge through the cleaning zone. This oscillating stream of air accomplishes three functions producing, as an end result, effective removal of dust particles from the various surfaces of the individual partitions in the charge thereof, namely: (1) it separates the closed relationship between the partitions of the charge undergoing cleaning, (2) it furnishes variable rates of air flow moving across these surfaces of the said partitions, and (3) it causes a feathering or fluttering action between the strips in the charge undergoing cleaning so as to cause a shaking action tending to dislodge the dust particles by the physical impact created during this fluttering action plus causing a variation in the air flow over the surfaces of the partitions of the charge undergoing cleaning.

It has been found that dust removal may be accelerated by also imparting a vertical vibratory movement to the partitions of the charge undergoing cleaning. This vibration has the effect of assisting the separation of the partitions. Also, air flow may be more positively controlled for more effectively removing dust particles by evacuating the air from the area at the side of the charge of partitions undergoing cleaning opposite from the side where the stream of air is directed into it. Evacuating the air, thusly, also enables drawing the dust particles removed from the partitions into the area of air evacuation, whereupon these removed particles are conveyed to a point of disposal by the air stream created by such evacuation.

This feature of the invention has the advantage of maintaining the work place around the cleaning zone almost entirely free of dust.

Referring to the drawings, a novel form of apparatus of the invention will now be described.

In FIGS. 1–3, a table 10 having side members 11 and 12 provides a horizontal top surface having end sections 13 and 14 and an intermediate perforated or grated section 15. The perforated section 15 is pivotally connected at one side to end section 14 by a pair of spaced apart hinges 16, and its marginal edges spaced from the stationary portions of table 10 to permit limited oscillatory pivotal movement about the pivot of hinge 16 in a substantially vertical direction. The perforated section 15 is connected near its free end to a pair of rocker arms 17 by side brackets 18. Brackets 18 are each bolted to the sides of section 15 and have an integral rocker shaft 19 projecting horizontally outwardly (FIG. 2). A bearing 20 at the end of each rocker arm 17 has journal connection on rocker shaft 19. A transverse shaft 21 is journal mounted near each of its ends for rotation in bearings of mountings 22 and 23 bolted to the side members 11 and 12, respectively, of table 10. At either end of shaft 21 are similar integral crank shafts 24, their central axis being eccentric with the central axis of shaft 21. End bearings 25 on rocker arms 17 are journaled over a corresponding crank shaft 24. Rotation of shaft 21 in either direction will provide vibratory movement to the perforate section 15 of the table through these eccentric driving connections. The shaft 21 is driven through gear 26 keyed to it and in mesh with drive pinion 27 keyed on the drive shaft 28 of an electric motor 29. Motor 29 is mounted in operating position on a base 30 near the base of table 10.

At the top of table 10 are a pair of parallel side guide members 31 and 32 disposed longitudinally of the table surface to extend along sections 13, 15 and 14 thereof, as viewed from right to left in FIG. 3. Guide member 31 may be rigidly connected near the side of the table on sections 13 and 14, however, guide member 32 is adjustable on the table by a pair of slotted brackets 33 attached to depend horizontally from guide member 32. The slots 33a of each of the brackets 33 are adapted to receive set screws 34 threaded into the top of sections 13 and 14 of the table top surface to secure the guide member 32 in a set position. Thus, guide member 32 is adjustably mounted on the table permitting lateral adjustment of it with respect to the fixed guide member 31. The guide path between the two side guide members may accordingly be adjusted (as indicated by dotted outline in FIG. 3) to accommodate various lengths of partition strips to be moved therethrough.

The guide members 31 and 32 are each constructed as angle members having respective integral horizontal sections 31a and 32a which lie adjacent to the top surface of end sections 13 and 14 of table 10. A pair of top guide members 35 and 36 are adjustably supported by brackets 37 slidable on upright posts 38 and clamped thereon at the proper height setting by screw 39 (FIG. 2). The upright posts 38 are integrally connected on the horizontal sections 31a and 32a of the side guide members 31 and 32.

As seen on FIGS. 1 and 2, the top guides 35 and 36 are set to an operating position at a height to permit the column of work pieces of corrugated partitions A to pass beneath them yet allow only a limited amount of vertical movement of the partitions while they pass over the vibrating section 15 of the table surface. By the mounting, just described, the top guides may be adjusted to accommodate any height of partitions.

The partitions A may be fed onto the end section 13 of table 10 by any convenient means and are stacked in upright position on an edge surface along their length and are in a closed or compacted abutting relationship. The stacked partitions may be supplied to the table either continuously or intermittently. One efficient means contemplated for feeding the partitions to the table and through the guides 31 and 32 and 35 and 36 is to place the end section 13 of the table in abutting and aligned relationship with the outer end of the table surface at the discharge end of the partition sawing and slotting machine, so that the feed mechanism of the partition sawing and slotting machinery may be utilized to move the stacked formed partitions A through the defined guide path on the table 10. From the disclosure in the aforementioned copending application of McCormick, it should be obvious how this type of feed may be readily adapted. However, for simplicity of illustration herein (FIGS. 1 and 2), a ram 40 is shown for intermittently moving charges or groups of the stacked partitions A through the guides and through the cleaning zone over center section 15 of the table surface. As the stacked partitions are moved through this guide path they are vibrated vertically on the oscillating section 15 of the table. At this point in their movement, the partitions are subjected to the cleaning treatment by forced air for removal of any dust particles of corrugated paper or other foreign matter that may be present.

In FIG. 2, an air nozzle assembly, designated generally as 41, has an upper tubular portion 42 that is attached for horizontal oscillating movement by a carriage means, to be presently described. The lower portion 43 of the nozzle assembly 41 communicates with the internal passage in the upper portion 42 and tapers downwardly to a "fishtail" nozzle 44 defining a narrow nozzle opening 45 overlying the partitions A (FIGS. 2 and 4) and extending laterally with respect to the top of the table 10 (FIG. 3). As shown on FIG. 2, fishtail nozzle 44 extends over a lateral span that covers a substantial portion of the width of the table 10, however, the length of the partition A undergoing cleaning may be substantially less than that span. To make the most effective use of the air from the nozzle, the span of the nozzle opening 45 may be regulated by longitudinally adjusting a cover plate 46 carried across the bottom of the nozzle 44. The cover plate 46 is mounted by integral guides which slide along tongue guide members 47 bolted at either side of the nozzle 44 (FIGS. 2 and 4). At the one end wall of nozzle 44 is a flange projection 48 (FIGS. 2 and 3) aligned to overlie the inner uppermost surface of cover plate 46. The cover plate has a series of longitudinally disposed holes 49 therethrough (see FIGS. 2 and 3) and its longitudinal position along the span of nozzle 44 may be secured by inserting a pin 50 through flange 48 and one of the holes 49.

The upper tubular portion 42 of the nozzle assembly 41 is connected through flexible tubing 52 to a forced air source produced by blower 51 (FIG. 1). The blower 51 is driven through conventional motor drive (not shown) to supply high velocity forced air to the nozzle assembly 41 which directs the air downwardly by the fishtail nozzle 44 and into the partitions A therebeneath.

The nozzle assembly 41 is mounted on a tubular crossframe comprising tubes 53 and 54. The outer ends of the tubes 53 and 54 are provided with integral shafts 55 and 56, respectively (FIG. 3). Wheels 57 are rotatable on the shafts 55 and 56, the wheels 57 being held in place on shaft 55 by pinned end collars 58, whereas the wheels 57 on shaft 56 are retained by spacers 59 between them and the end bearings 60 of pitman 61. These end bearings 60 are retained on the shafts 56 by nuts 62 threaded on the ends of shafts 56. The wheels 57 of the crossframe run on horizontal tracks 63 which are supported by uprights 64 bolted to the two sides 11 and 12 of the table 10 (FIG. 1). Uprights 64 are structurally connected by two horizontal channel members 65 that extend rearwardly and support a motor mounting frame 66.

The tubular crossframe 53—54 is tied together by a pair of members 75 (FIGS. 1 and 3) and is driven in reciprocating fashion by pitman 61 pivotally connected on pivots 67 of crank wheels 68 (FIG. 1). Two crank wheels 68 are keyed to the ends of a transfer shaft 69 journal mounted in end bearing housing 70 bolted to the channel members 65 (FIG. 2). The shaft 69 is driven by an electric motor 71 bolted to frame 66 and transmits its power through the V-belt drive 72 over driving sheave 73 on motor 71 and the driven sheave 74 keyed on shaft 69.

Thus, it may be seen that driving rotation transmitted by motor 71 to shaft 69 will rotate the crank wheels 68 in unison and provide a crank and pitman drive through crank pin 67, pitman 61, and its connection at end bearing 60 to the end shafts 56 of tubular member 54. The tubular members 53 and 54 are tied together by members 75 rigidly at their ends to each of the tubular members. This driving motion will reciprocate the crossframe 53—54 along track 63 so as to oscillate the blast of air being emitted through the opening 45 of the nozzle 44.

As previously mentioned, the nozzle assembly is supported at its upper tubular portion 42 on the crossframe 53—54. This connection is shown in detail on FIG. 4, and comprises U-shaped guide channels 79 securely fastened at either side of the upper tubular portion 42 of the nozzle assembly and blocks 76 nested around tubes 53 and 54 of the crossframe. Blocks 76 each have upper and lower T-bolts 77 therethrough, the T-end 78 of each of the said T-bolts fitting in the U-shaped channel 79 on the nozzle assembly so that the nozzle assembly is vertically adjustable slidably along the T-end 78 of bolts 77. The nozzle assembly 41 may be adjusted to the proper height in overlying relationship to the partitions A and nuts 80 then tightened on T-bolts 77. This clamps the nozzle assembly to the crossframe at a desired position for operation.

The just-described arrangement provides a bracket means on the oscillating crossframe and a cooperating fastener connection between said bracket means and the air nozzle assembly for connecting the air nozzle assembly 41 to the crossframe in a manner to permit vertical adjustment of the position of the air directing nozzle with respect to the underlying partitions. This bracket means and cooperating fastener could just as well be in the form of a rack gear mounted along the inner sides of the channels 79 and meshing rotatable pinions on shafts rotatable in the blocks 76.

As seen in FIGS. 1 and 2, the apparatus also includes an underlying chamber 85 bolted at the underside of end sections 13 and 14 of the table 10 by bolts 86. The upper port of chamber 85 is open adjacent the perforated section 15 of the table and the lower port of the chamber communicates with pipe 87 extending through an opening in the side section 11 of the table. The pipe 87 is connected to an air evacuating device, such as a motor-driven suction fan (not shown) or a vacuum pump (not shown), such device acting to evacuate air from the underside of the perforate section 15 of the table. This tends to drive the air emitted by the nozzle 44 down through the partitions and also serves as a means for collecting the dust at a remote disposal point away from the work area around the machine.

In FIG. 4, the enlarged sectional view at the cleaning zone demonstrates the manner in which a charge of the partitions A are treated by the oscillated stream of air being blasted down into the charge of the partitions from the nozzle 44. As this air blast is oscillated across the partitions, it creates the feathering or fluttering action between the partitions. The dust particles are dislodged and are carried downwardly into the chamber 85, thence to a collection and disposal point by the air being evacuated.

Various modifications may be resorted to within the spirit and scope of the appended claims.

We claim:

1. In combination, a horizontal table surface having end sections and a perforate intermediate section, side guide members disposed parallel and longitudinally of said table surface and spaced apart laterally thereon to receive and guide sawed and slotted corrugated strips being delivered to said table, means for moving said strips upright on edge in side-by-side relationship and through said parallel side guide members, an upright air nozzle assembly defining at its lower end a nozzle opening having a span effective for projecting a stream of air downwardly along the dimension of the strips extending between said side guide members as they are fed therethrough, a source of forced air, means operatively connecting said air source to said nozzle assembly, movable carriage means mounting said nozzle assembly so that its nozzle opening overlies said strips on the perforate section of the table surface, said carriage means being adapted for reciprocating movement, and power means operatively connected to reciprocate said carriage means parallel to the table surface for moving the nozzle assembly in oscillating fashion, thereby directing the forced air across surfaces of the underlying strips for cleaning them of loose particles.

2. The combination defined in claim 1, characterized by having the perforate section of the horizontal table surface independent from the end sections thereof, said perforate section being adapted for vibrating movement in substantially vertical direction, and vibrator drive means operatively connected to said perforate section of the table surface for imparting to it a vibratory movement.

3. The combination defined in claim 2, further characterized by the fact that the vibrator drive means comprises at least two spaced eccentrics operatively connected to the perforate section of the table surface, driven shafting connected to rotate each said eccentric, and a motor connected to drive the eccentrics through a driving connection with the driven shafting to thereby vibrate said perforate section of the table surface.

4. The combination defined in claim 3, wherein a top guide is supported for vertical adjustment with respect to the table surface on mountings at either side of said perforate sections, said top guide extending longitudinally of the table across said perforate section and disposed between said parallel side guide members in overlying relationship to said side guide members and spaced slightly above the top edge of the said corrugated strips being moved across said perforate section when said top guide is adjusted to operating position, whereby to permit limited vertical movement of said strips.

5. The combination defined in claim 4, wherein one of said side guide members is fixedly mounted at one side of the horizontal table and the other said member is mounted for adjustment laterally of the table for accommodating various lengths of corrugated strips.

6. The combination defined in claim 1, characterized by including a chamber underlying the perforated section of the horizontal table surface and means connected to said chamber for continuously evacuating air therefrom.

7. The combination defined in claim 1, wherein the movable carriage means comprises a pair of parallel tracks supported above the table surface and extending longitudinally thereof across its perforate section, a crossframe having end members movable on said tracks, and a bracket means and cooperating fastener for connecting the air nozzle assembly for vertical adjustment on said frame.

8. The combination defined in claim 7, wherein the power means connected for reciprocating the carriage means comprises an electric motor, a transverse shaft, end cranks on said transverse shaft, a driving connection between the shaft of said motor and said transverse shaft for imparting driving rotation to said end cranks, and connecting rods each pivotally connected at one of their ends to a crank and the other end pivotally connected to said crossframe.

9. The combination defined in claim 1, wherein the upright air nozzle assembly comprises an upper tubular portion connected to the source of forced air, and a lower hollow fishtail portion terminating in a nozzle defining a narrow elongated opening disposed substantially the width of the said perforated section of the table, and means adjustable for regulating the span of said opening effective for emitting forced air in a downwardly direction.

10. The combination defined in claim 9, wherein said means adjustable for regulating the span of the nozzle opening comprises a cover plate adapted to fit over and close said nozzle and slidably mounted for longitudinal movement along said opening to regulate its span to correspond with the length of corrugated strip being fed thereunder between the parallel side guides.

11. The combination defined in claim 10, wherein the movable carriage means mounting the nozzle assembly includes an adjustable connection between the upper tubular portion of said nozzle assembly and said carriage means permitting vertical adjustment of the former on the latter.

References Cited in the file of this patent

UNITED STATES PATENTS

| | | |
|---|---|---|
| 316,938 | Black | May 5, 1885 |
| 468,521 | La Fountaine | Feb. 9, 1892 |
| 1,037,081 | Thorne | Aug. 27, 1912 |
| 1,252,127 | Long | Jan. 1, 1918 |
| 1,375,663 | Ainsworth | Apr. 26, 1921 |
| 1,711,763 | White | May 7, 1929 |
| 2,620,961 | Wahl et al. | Dec. 9, 1952 |
| 2,677,629 | Buck | May 4, 1954 |
| 2,752,273 | Mitchell | June 26, 1956 |